United States Patent
Li et al.

(10) Patent No.: US 9,407,565 B1
(45) Date of Patent: Aug. 2, 2016

(54) DETECTION AND REPAIR OF PERMANENT PAUSE ON FLOW CONTROLLED FABRIC

(71) Applicant: Google Inc., Mountain View, CA (US)

(72) Inventors: Jiangbo Li, Sunnyvale, CA (US); Junlan Zhou, Sunnyvale, CA (US); Ke Xiao, Mountain View, CA (US); Victor Lin, Fremont, CA (US); Ashish Vibhakar Naik, Los Altos, CA (US); Shidong Zhang, San Jose, CA (US)

(73) Assignee: Google Inc., Mountain View, CA (US)

( * ) Notice: Subject to any disclaimer, the term of this patent is extended or adjusted under 35 U.S.C. 154(b) by 78 days.

(21) Appl. No.: 14/307,713

(22) Filed: Jun. 18, 2014

(51) Int. Cl.
*H04L 12/835* (2013.01)
(52) U.S. Cl.
CPC ..................... *H04L 47/30* (2013.01)
(58) Field of Classification Search
CPC ......... H04L 47/30; H04L 47/10; H04L 47/11; H04L 47/115; H04L 47/12
See application file for complete search history.

(56) References Cited

U.S. PATENT DOCUMENTS

| | | | |
|---|---|---|---|
| 6,738,872 B2 | 5/2004 | Van Huben et al. | |
| 6,859,435 B1 * | 2/2005 | Lee | H04L 47/10 370/231 |
| 8,593,965 B2 * | 11/2013 | Rongong | H04L 49/35 370/231 |
| 2004/0120334 A1 * | 6/2004 | Nation | H04L 47/10 370/412 |
| 2010/0278042 A1 * | 11/2010 | Monnes | H04L 43/0894 370/230 |
| 2013/0003550 A1 | 1/2013 | Winegarden et al. | |
| 2013/0258851 A1 | 10/2013 | Mayya et al. | |

OTHER PUBLICATIONS

Song, W., Zhang, G., & Garside, J. (May 21, 2014). On-Line Detection of the Deadlocks Caused by Permanently Faulty Links in Quasi-Delay Insensitive Networks on Chip. Proceedings of the 24th Edition of the Great Lakes Symposium on VLSI. GLSVLSI '14, pp. 211-216.

* cited by examiner

*Primary Examiner* — Mohammad Anwar
(74) *Attorney, Agent, or Firm* — McDermott Will & Emery LLP

(57) ABSTRACT

Aspects of the present disclosure relate to detecting and repairing permanently pauses on a flow controlled fabric. In one aspect, one or more computing devices, such as a switch or a centralized controller, may detect whether a port of a network device receives one or more pause messages. The pause messages may instruct the network device to pause data transmission. Further, the one or more computing devices may determine a period of time during which the port receives the one or more pause messages and identify the port as a permanently paused port based on the determined period of time. The one or more computing devices may then reconfigure the permanently paused port to stop complying with the one or more pause messages.

23 Claims, 9 Drawing Sheets

DETECTION AND REPAIR OF PERMANENT PAUSE ON FLOW CONTROLLED FABRIC

BACKGROUND

Data transmission rates between nodes of a flow controlled fabric may be managed using various flow control techniques. For instance, if the rate of data transmission from a sending node is faster than the rate at which a receiving node can accept it, the receiving node may send a message to the sending node instructing it to temporarily stop transmission until it can catch up to speed.

One example of a flow control technique is Ethernet flow control. This technique involves stopping and resuming the transmission of data between two nodes on a full-duplex Ethernet physical link. By pausing and restarting data transmission, Ethernet flow control prevents buffers on the receiving nodes from overflowing and dropping data packets. An Ethernet PAUSE frame may be used to temporarily stop data transmission. PAUSE frames can be sent in both directions on the link. The receiver will transmit a PAUSE frame to the sender instructing it to stop sending more traffic. On the other side, the sender will respond to the PAUSE frame and stop sending traffic.

In the example above, one or more distributed deadlocks may occur due to transient routing loops in the network and may cause PAUSE frames to propagate throughout. Once the PAUSE frames begin to propagate, the entire network may be at risk to a permanent pause. One example of a deadlock prevention technique may be the "Banker's algorithm." However, the Banker's algorithm does not account for or prevent software bugs that may persist on the network devices. Another reason of permanent pause may be faulty hardware, which may send PAUSE frames to various network components for an indefinite period of time despite not receiving any data from those network components.

BRIEF SUMMARY

In one aspect, a method comprises detecting, with one or more computing devices, whether a port of a network device receives one or more pause messages. The pause message instructs the network device to pause data transmission. The method further comprises determining, with the one or more computing devices, a period of time during which the port receives the one or more pause messages. Based on the determined period of time, the method further comprises, identifying, with the one or more computing devices, the port as a permanently paused port, and reconfiguring, with the one or more computing devices, the permanently paused port to stop complying with the one or more pause messages.

In another aspect, a system comprises a memory and one or more processors coupled to the memory. The one or more processors are configured to detect whether a port of a network device receives one or more pause messages instructing the network device to pause data transmission, and determine a period of time during which the port receives the one or more pause messages. Further, the one or more processors are configured to identify the port as permanently paused port based on the determined period of time, and reconfigure the permanently paused port to stop complying with the one or more pause messages.

In a further aspect, a non-transitory computer readable medium on which instructions are stored, the instructions when executed by one or more computing devices performs a method, the method comprises detecting whether a port of a network device receives one or more pause messages, wherein the pause message instructs the network device to pause data transmission. Further, the method comprises determining a period of time during which the port receives the one or more pause messages, and identifying the port as a permanently paused port based on the determined period of time. Based on this identification, the further comprises reconfiguring the permanently paused port to stop complying with the one or more pause messages.

DETAILED DESCRIPTION

Figure 1:
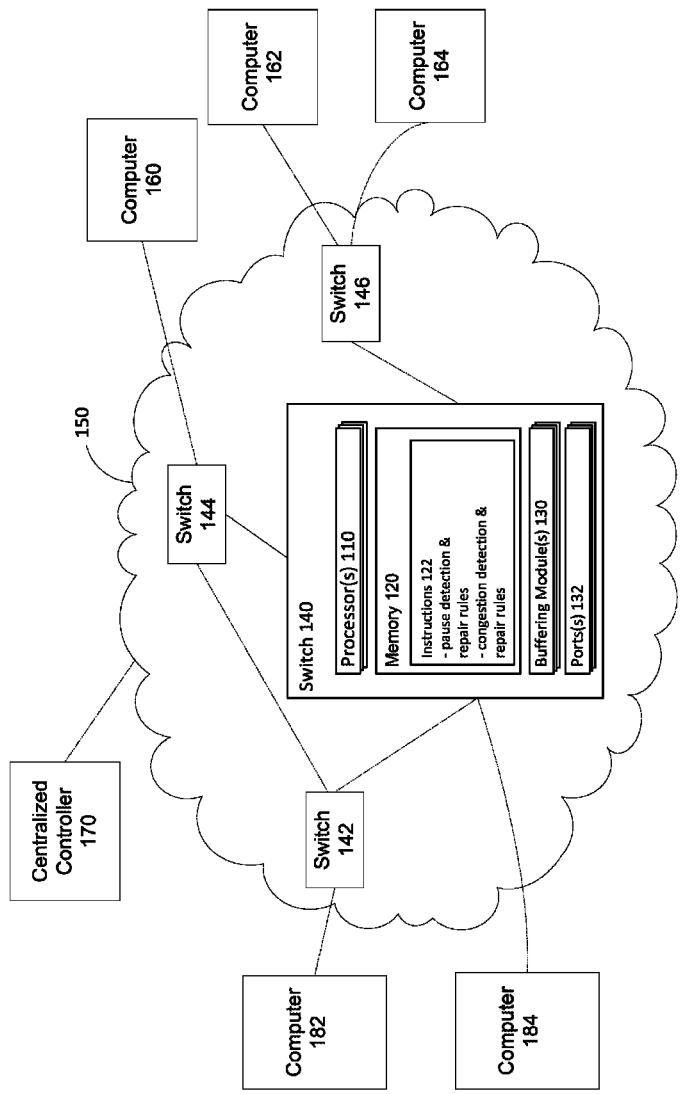
FIG. 1 is a system diagram in accordance with aspects of the disclosure.

The present disclosure is directed to a method for detection and repair of permanent pause on flow controlled fabric. For example, a plurality of network devices (e.g., switches) on a flow controlled network may be facilitating data transmission among one or more computers that may be connected to each network device. Each network device may monitor the ports of its neighboring network devices to detect whether data transmission has been permanently paused. When a permanently paused port is detected, a network device may repair it in order to prevent the permanent pause from propagating throughout the network.

In one aspect, a switch may determine that a neighboring port is permanently paused if the port receives a series of pause messages for a particular period of time. A pause message, for example, may instruct a switch to temporarily pause data transmission for various reasons (e.g., network congestion, overwhelmed switch, etc.) In this aspect, the switch may detect that a port on a neighboring switch has been receiving a series of pause messages. The switch may then determine how long the port is receiving the series of pause messages. If the duration of time is equal to or longer than a predetermined period of time (e.g., 1 second, 10 seconds, etc.), the switch may identify the port as a permanently paused port, or a stuck port.

Various repair rules may be utilized to repair a stuck port and subsequently drain backed up network traffic. In one example, a switch may repair a stuck port by reconfiguring the port to stop honoring the received pause messages and resume data transmission. Upon repair, the port may be configured to start honoring subsequent pause messages. In another example, if the stuck port does not receive any more pause messages for a particular duration of time, the port may no longer be considered a stuck port. In yet another example, a stuck port may receive a resume message, which instructs the switch to resume data transmission at the port. In this regard, a stuck port may be re-designated as no longer stuck upon the receipt of a resume message and automatically repaired.

In another aspect, a switch may determine that a neighboring port is congested based on the number of resume messages the port receives within a period of time. As noted above, a resume message may automatically repair a stuck port and allow data transmission to recommence. However, the repaired port may then permanently pause again if it receives another series of pause messages. Thus, over a period of time, a switch may count the number of resume message the port receives to determine whether the port is congested. For instance, if the port receives less than a threshold number of resume messages, then the switch may identify the port as congested. The switch may then reconfigure the congested port to stop honoring subsequent pause messages the port receives.

The above-described features may be advantageous in that a network device may be able to detect, repair and unclog backed up network traffic at a permanently paused or congested port of a neighboring device. In that regard, the technology may prevent the entire network fabric from freezing up. Another advantage is that the technology may be implemented on any type of network.

FIG. 1 illustrates an example network 150 that joins a plurality of computing devices, e.g., computers 160, 162, 164, 182, 184, as well as a centralized controller 170. The network 150 may be, for example, a datacenter or any other collection of switches or other network devices joining two or more host devices. The network 150 may also be a flow controlled fabric and include a plurality of switches 140, 142, 144, 146. Each switch may include one or more processors 110 and a memory 120 coupled to the one or more processors 110. Each switch may further include one or more buffering modules 130 for managing outgoing/incoming data packets, and one or more ports 132 to accommodate outgoing/incoming data through the network 150.

The centralized controller 170 is also connected to network 150, which may include one or more servers having a plurality of computing devices, e.g., a load balanced server farm, that exchange information with different nodes of a network for the purpose of receiving, processing and transmitting data to and from other computing devices in the network 150, and other connected networks (not shown). The centralized controller 170 may store and process information about the topology of the network 150, or individual topologies of other various networks that may be connected to network 150.

The computers 160, 162, 164, 182, 184 may be any of a variety of computing devices, including servers in a datacenter, personal digital assistants (PDAs), laptops, tablet PCs, netbooks, PCs, etc. These devices may be connected to the network 150 via a wired connection, such as through a modem, or wirelessly, such as through an access point in communication with one of the routers 140-146. Although only a few computers are depicted in FIG. 1, it should be appreciated that the system can include a large number of connected computers, with each different computer being at a different node of the network 150.

The network 150, and intervening nodes, may comprise various configurations and protocols including the Internet, World Wide Web, intranets, virtual private networks, wide area networks, local networks, private networks using communication protocols proprietary to one or more companies, Ethernet, WiFi (such as 802.11, 802.11b, g, n, or other such standards), and HTTP, and various combinations of the foregoing. Such communication may be facilitated by any device capable of transmitting data to and from other computers, such as modems (e.g., dial-up, cable or fiber optic) and wireless interfaces.

In addition, the network components depicted within network 150 of FIG. 1 are not limited to only switches. For example, the switches 140-146 depicted in network 150 may be any network component or device capable of receiving and forwarding data or data packets to appropriate destinations of a computer network, such as a network router, a hub, network interface controller (NIC), etc.

As noted above, each switch may have a processor and a memory, such as memory 120 of the router 140. The memory 120 stores instructions 122, for example, for detecting and repairing paused or congested ports. Moreover, each router may also include one or more buffering modules 130 for storing and managing outgoing/incoming data packets, and one or more interface components to accommodate the transmission and reception of the data through the network 150.

The one or more processors 110 of switches 140 may be any conventional processors, such as commercially available CPUs. Alternatively, the one or more processors may be a dedicated device such as an ASIC or other hardware-based processor, such as a field programmable gate array (FPGA). Although FIG. 1 functionally illustrates the processor(s), memory, and other elements of router 140 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a casing different from that of switch 140. Accordingly, references to a processor or computing device will be understood to include references to a collection of processors or computing devices or memories that may or may not operate in parallel.

The memory 120 of switch 140 may store information accessible by the one or more processors 110, including data (not shown), instructions 122 that may be executed or otherwise used by the one or more processors 110. The memory 120 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data may be retrieved, stored or modified by the one or more processors 110 in accordance with the instructions 122. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 122 may be any set of instructions to be executed directly (such as machine code) or indirectly (such as scripts) by the one or more processors 110. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

As will be discussed in more detail below, the one or more processors 110 may execute the instructions 122 to detect permanently paused ports or congested ports on neighboring switches 142, 144 and 146 in network 150. Upon detection of either a permanently paused port or a congested port, the one or more processors 110 may further execute instructions 122 to repair the paused or congested ports.

Switch 140 may have all of the components normally used in connection with a computing device such as the processor and memory described above. As previously noted, the network components and/or devices depicted in FIG. 1 are not limited to switches. These devices may be any device capable of receiving and forwarding message frames and/or data packets to appropriate destinations of a computer network. In that regard, the switches shown in FIG. 1 may have one or more buffering modules, e.g., buffering module(s) 130, to buffer data that may be waiting to be transmitted to a particular destination, or may be waiting to be processed by the one or more processors. Moreover, the switches may also have one or more ports(s) 132, to accommodate outing data and incoming data.

The one or more buffering modules 130 may be configured to manage a plurality of data queues, schedule numerous data transmissions and also store data in parallel with memory 120 to alleviate data bottle-necking. For example, the one or more buffering modules 130 may assist in managing data queues to prevent packet congestion. In addition, the buffering modules 130 may be involved in scheduling transmission policies based on various techniques, such as strict priority, weighted round-robin (WRR), weighted fair queuing (WFQ), etc. The one or more ports 132 may be configured to receive incoming data packets and transmit outgoing data. The one or more ports 132 may be arranged on an interface card capable of performing inbound and outbound packet forwarding.

As shown in the network 150 of FIG. 1, switch 140 may be capable of communicating with other switches 142, 144, 146 as well as computers 160, 162, 164, 182, 184. For example, switch 140 may be in communication with switch 142, 144 and 146 in order to facilitate network communication in accordance with the instructions 122 and data stored in memory 120. Similarly, switch 140 may be in communication with computers 160, 162, 164, 182 or 184 either directly or via the switches 142, 144, and 146. Although the switches in network 150 are shown to each have one or more processors, the processing may alternatively be done by one or more processors residing in the centralized controller 170.

Figure 2:
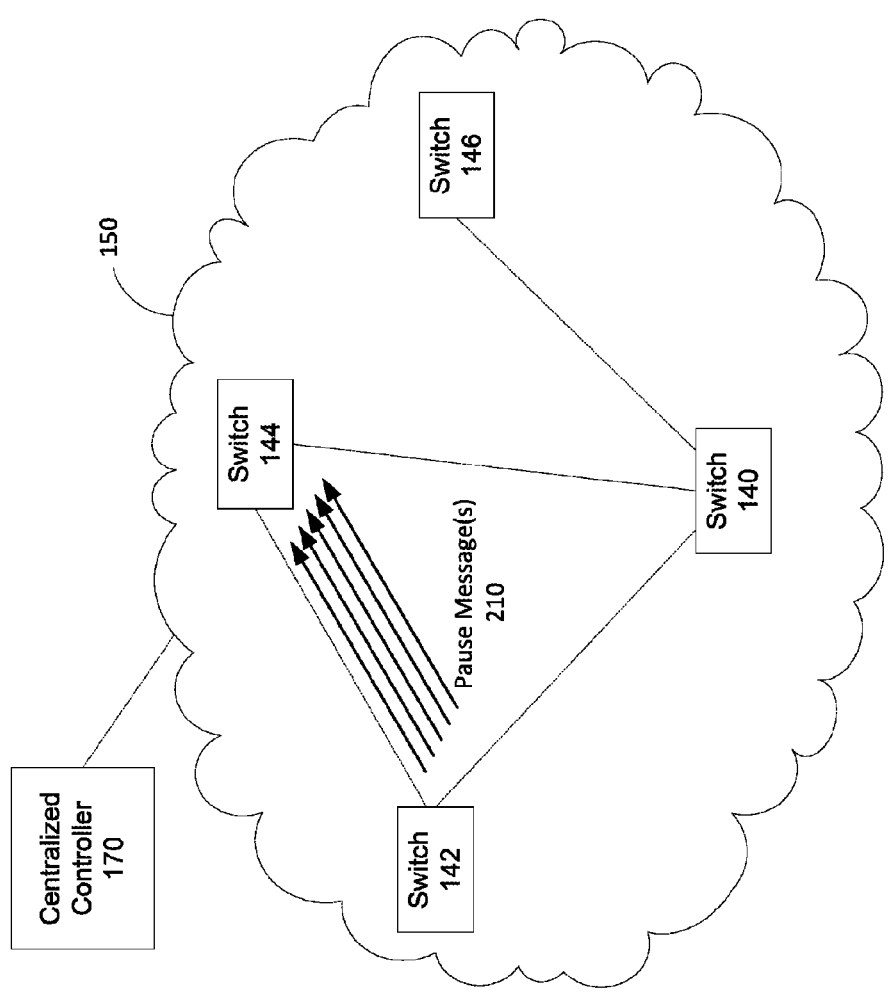
FIG. 2 illustrates an example detection of one or more pause messages in an example network in accordance with aspects of the disclosure.

FIG. 2 illustrates an example detection of one or more pause messages in the network 150. It should be understood that additional switches may be included in network 150 and this example is provided for illustrative purposes only. Further, it should be understood that network 150 may be connected to additional networks, which may or may not be configured similarly to network 150. As noted above, switch 140 may be connected to switches 142, 144 and 146 in a particular configuration. Here, switches 140, 142 and 144 are connected together to form a switching loop, while switches 140 and 146 are connected independently. Based on this configuration, switches 142, 144 and 146 may be considered neighboring switches of switch 144. Similarly, switch 140 may be considered a neighboring switch of switch 146; switches 140 and 142 may be considered neighboring switches of switch 144; and switches 140 and 144 may be considered neighboring switches of switch 142. In that regard, switch 140, for example, may continually monitor network traffic flow at the ports of switches 142, 144 and 146 to detect and repair any permanent pauses that may occur. The other switches may also continually monitor ports in a similar manner.

A non-limiting feature of the disclosure may be that a switch (or a centralized controller) may be configured to monitor network activity at the ports of its neighboring switches. This may be advantageous because, in some scenarios, a switch may not be able to detect that one or more of its own ports are permanently paused or congested for various reasons, such as a software crash. Therefore, allowing the switches to monitor, detect and repair each other's ports may prevent the occurrence of these scenarios.

As shown in FIG. 2, switch 140 may be monitoring the one or more ports at switch 144. In this example, switch 144 may be transmitting data at a rate faster than the one or more ports at switch 142 can receive it. In response, switch 142 sends a consecutive series of five pause messages 210 to switch 144, instructing switch 144 to temporarily stop data transmission. Subsequently, the one or more processors 110 executing instructions 122 at switch 140 may detect that switch 144 has received and/or is continuing to receive pause messages from switch 142. As will be further discussed with respect to FIGS. 3-4 below, switch 140 may determine whether switch 144 is permanently paused, or stuck, based on one or more pause detection rules. If switch 140 determines that a particular port at switch 144 is stuck, the one or more processors 110 of switch 140 may execute instructions to implement a repair rule to drain network traffic backed up at the stuck port to prevent network 150 from permanently pausing. While FIG. 2 depicts switch 140 monitoring the one or more ports at switch 144, the monitoring may alternatively be done by the centralized controller 170.

Figure 3:
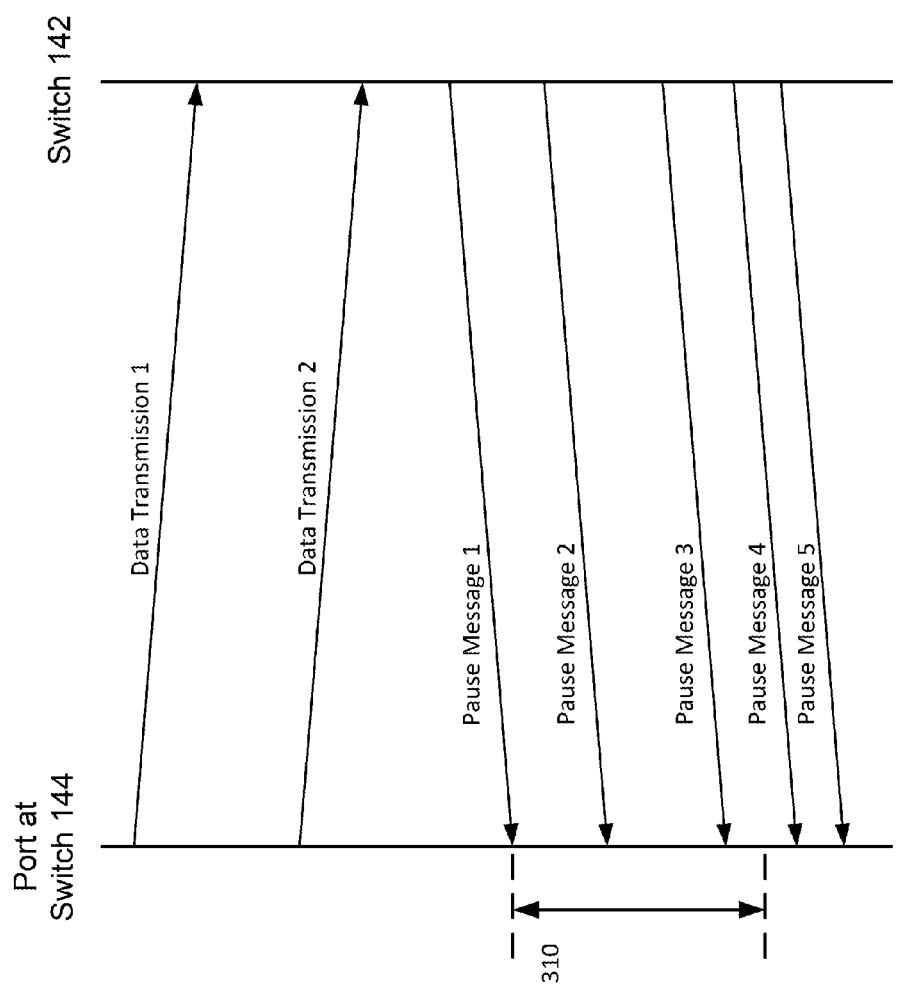
FIG. 3 is an example timing diagram in accordance with aspects of the disclosure.

FIG. 3 is an example timing diagram 300 between switches 142 and 142 in the network 150. By way of example only, switch 144 sends data transmission 1 to a port at switch 142. Shortly thereafter, switch 144 sends data transmission 2 to the same port at switch 142. At this point, switch 142 may determine that switch 144's rate of data transmission is faster than the rate at which the port can receive it. Thus, switch 142 sends pause message 1 to switch 144 with instructions to temporarily stop data transmission until switch 142 can catch up to speed. Subsequently, switch 144 may receive additional pause messages, such as pause messages 2-5, indicating that the port at switch 142 is still overwhelmed and temporarily cannot receive any more data. Thus, the pause messages 1-5 depicted in FIG. 3 represent the series of pause messages 210 shown in FIG. 2.

A network device may determine that a port of a neighboring network device is stuck based on one or more pause detection rules. For example, switch 140, shown in FIG. 2, may detect that a port at switch 144 received pause message 1 from switch 142 and is continuing to receive additional pause messages 2-5. Upon detection of pause message 1, switch 140 may employ a pause detection rule to determine whether the port at switch 144 is stuck. In a non-limiting example only, a pause detection rule may be based on whether the port at switch 144 receives a series of pause messages for a predetermined period of time.

As shown in FIG. 3, the predetermined period of time may be a time period 310. In this regard, as soon as switch 140 detects pause message 1 at the port, switch 140 monitors whether the port receives a series of pause messages for the time period 310. If this pause detection rule is met, as is the case in FIG. 3, switch 140 designates switch 144 as permanently paused, or stuck. The length of time period 310 may be as short as approximately one second and may be as long as several minutes. Various factors may dictate the length of the predetermined time period, such as network topology, number of total network components, bandwidth, network throughput, number of other connected networks, etc.

Once a switch designates a port of a neighboring switch as stuck, the switch may then employ one or more repair rules to drain the backed up network traffic at the port. For instance, a repair rule may include reconfiguring a stuck port to stop honoring the pause frames and continue data transmission. In other words, the switch may reconfigure the stuck port to ignore previous pause messages as well as any subsequent pause messages. Accordingly, in the example above, switch 140 may reconfigure switch 144 to stop honoring pause messages 1-3 and resume data transmission to switch 142. Additionally, switch 140 may reconfigure switch 144 to stop honoring subsequent pause messages 4-5. In that regard, any backed up data (not shown) at the stuck port may be drained and any potential propagation of pause messages throughout network 150 (and beyond) may be prevented.

As each stuck port is reconfigured to stop honoring pause messages in a network, backed up data (e.g., packets, message frames) may be quickly drained to downstream network devices. A consequence reconfiguring ports to ignore pause messages may be dropped data on the other end of transmission. However, the consequence of dropped data transmissions may be minimal compared to the consequences of a permanently paused network.

Figure 4:
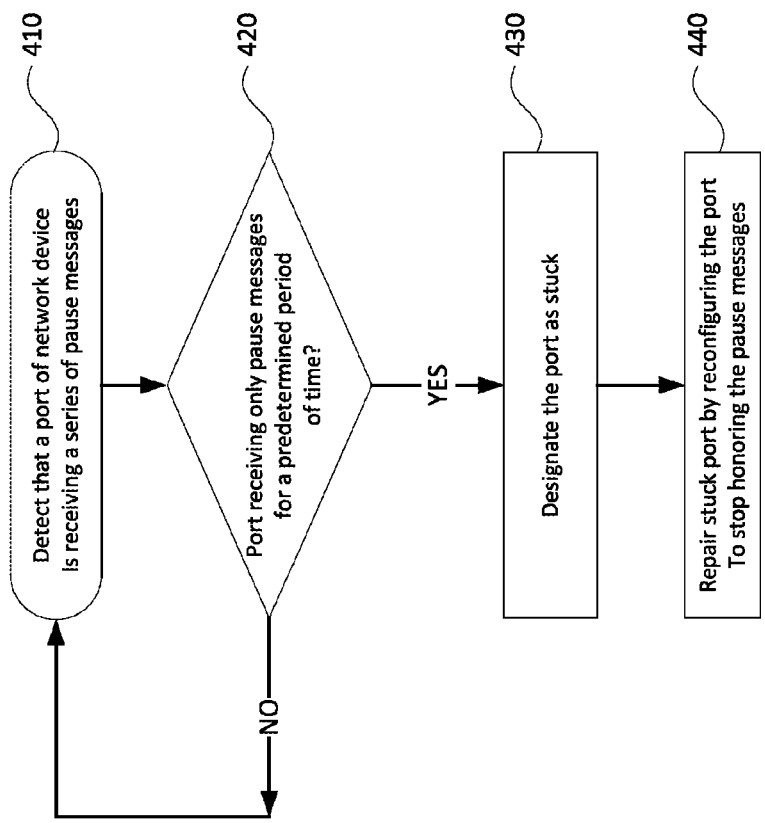
FIG. 4 is a flow diagram of an example method of detecting and repairing a stuck port in accordance with aspects of the disclosure.

FIG. 4 is an example flow diagram 400 of a network device detecting and repairing a stuck port. Using the non-limiting example depicted in FIG. 3, switch 140 detects that a port at switch 144 received pause message 1 at block 410. Upon detection of pause message 1, switch 140 may employ a pause detection rule and determine whether the port receives a series of pause messages for a predetermined period of time at block 420. As noted above, the duration of the predetermined time period may be different for each component of each network. Nonetheless, it should be understood that the duration should be configured in a manner such that the network devices detect and repair stuck ports within a sufficient amount of time to prevent the entire network from permanently pausing. If switch 140 determines that the port has not received a series of pause messages for the predetermined period of time at block 420, then the one or more processors 110 of switch 140 executing instructions 122 continues to monitor its neighboring ports until another pause message is detected.

However, if switch 140 determines that the port has received a series of pause messages for the predetermined period of time at block 420, then at block 430, switch 140 may determine that the port of switch 144 is stuck and designate as such. Simultaneously, or at least immediately after the port is determined as stuck, the one or more processors 110 executing the instructions 122 of switch 140 may repair the stuck port by reconfiguring that port to stop honoring the previously received pause messages and any subsequent pause messages thereafter. While flow diagram 400 of FIG. 4 is described by way of switch 140, the detection and repair of the stuck port may alternatively be done by the centralized controller 170.

Figure 5:
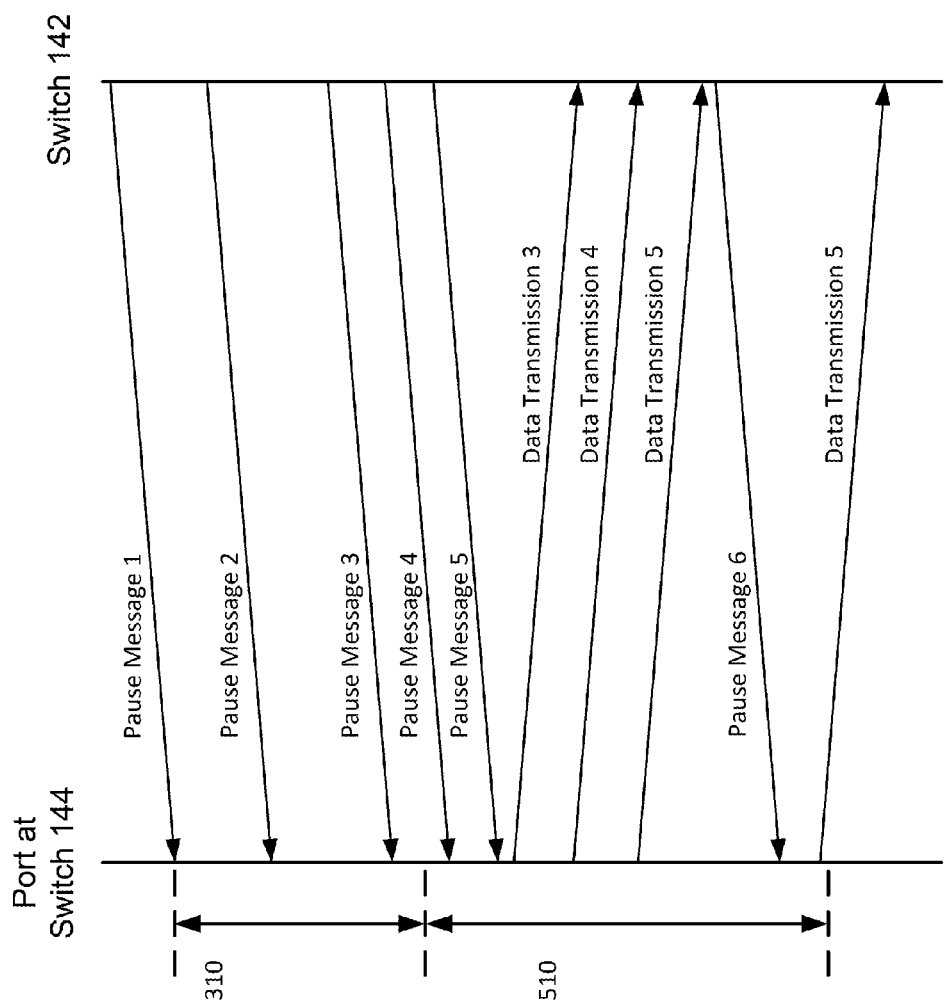
FIG. 5 is another example timing diagram in accordance with aspects of the disclosure.
Figure 6:
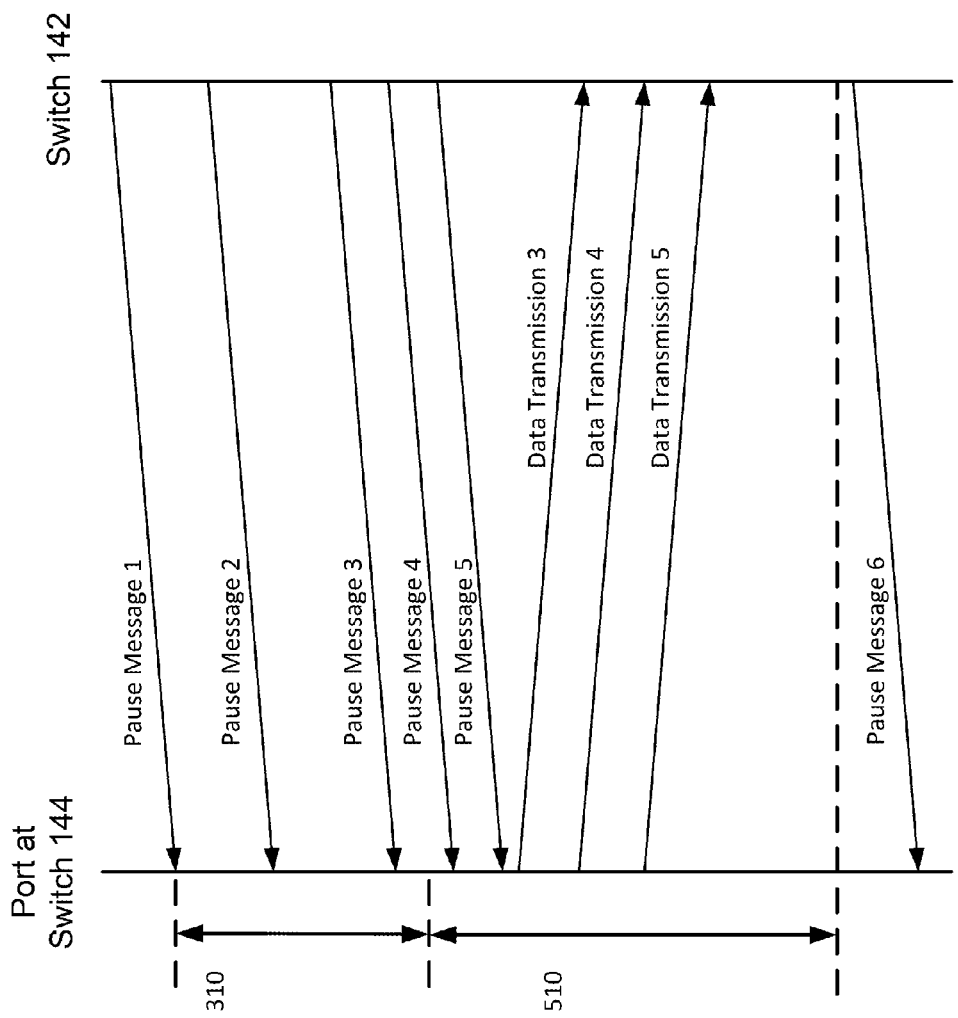
FIG. 6 is another example timing diagram in accordance with aspects of the disclosure.

If one or more stuck ports are reconfigured to stop honoring previous and/or subsequent pause messages for an indefinite period of time, the flow control functionality of a network may be diminished. In this regard, a reconfigured port may be switched back to honoring pause messages if one or more conditions are met within a predetermined period of time. FIGS. 5-6 are further example timing diagrams illustrating this feature.

As described above, switch 140 may determine that a port at switch 144 is stuck based on the series of pause messages 1-3 switch 140 received during time period 310. Subsequently, switch 140 may reconfigure the port to stop honoring previous pause messages 1-3 and any subsequent pause messages, such as pause messages 4-5. Thus, as shown in FIG. 5, switch 144 sends data transmissions 3-5 to switch 142 despite receiving pause messages 4 and 5. After sending data transmission 5, however, switch 144 receives pause message 6. At this point, switch 144 may determine whether it should disregard or honor pause message 6 depending on one or more conditions that may be met within a predetermined period of time.

For example, once the stuck port at switch 144 is reconfigured to stop honoring pause messages, switch 144 may continue to monitor whether the port receives any subsequent pause messages for a second predetermined period of time, such as time period 510. If the port receives a subsequent pause message within the predetermined time period 510, then the port at switch 144 may maintain its original designation of being stuck. Stated differently, if the port does not receive a subsequent pause message within time period 510, the port at switch 144 may be configured back to honoring any pause message it may receive after time period 510. Here, in FIG. 5, switch 144 receives pause message 6 within time period 510. Thus, switch 144 may determine that it must ignore pause message 6 and resume data transmission, as depicted by data transmission 5.

FIG. 6 is another example timing diagram depicting the port at switch 144 not receiving any pause messages during time period 510 after the port has been reconfigured to ignore pause messages. As shown, the port at switch 144 ignores pause messages 4-5 from switch 142 and sends a series of data transmissions 3-5. However, in this example, the port does not receive any pause messages within time period 510. Thus, switch 140 may re-designate the port as no longer stuck and configure the port to honor pause message 6. Meanwhile, switch 140 may continue monitoring the port to determine whether the port becomes stuck again.

The examples described above with respect to FIGS. 2-6 involve a network component, such as a switch or a centralized controller, actively performing the detection and repair of a stuck port, as well as facilitating the stuck/unstuck designations of the port. However, there may be additional instances where a stuck port is automatically re-designated as unstuck and repaired without a network component's active involvement. In one example, a resume message may automatically configure a stuck port that was previously configured to ignore pause messages to start honoring them. A resume message may generally follow one or more pause messages and may instruct a network device to un-pause and resume data transmission. As such, a resume message may automatically re-designate a stuck port as unstuck without a switch or a centralized controller's active participation.

Figure 7:
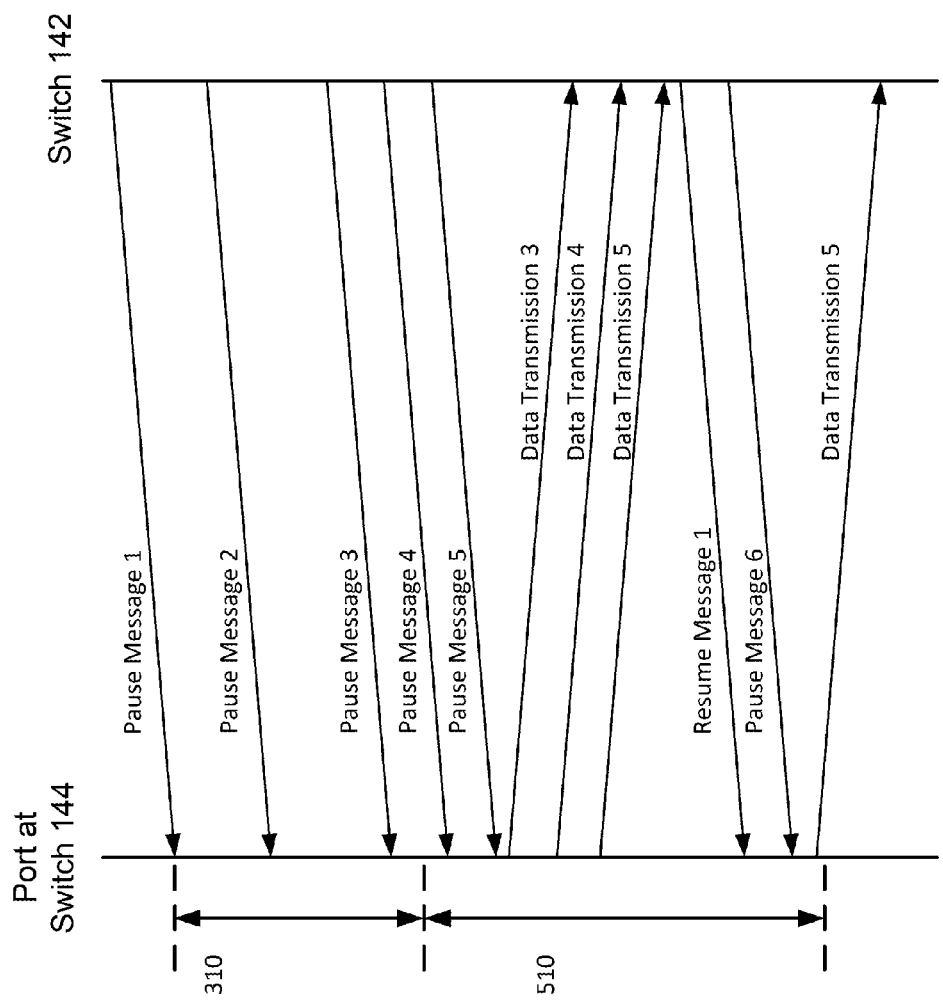
FIG. 7 is another example timing diagram in accordance with aspects of the disclosure.

FIG. 7 is another example timing diagram. As explained above with regard to FIG. 5, switch 140 may determine whether the port at switch 144 is required to honor pause message 6. In that example, the port at switch 144 ignores pause message 6 because it was received within time period 510. In FIG. 7, however, the port may be automatically reconfigured to honor pause message 6 even though the pause message is within time period 510. By way of example only, the port ignores pause messages 4-5 and sends data transmission 3-5 to switch 142. Subsequently, the port receives resume message 1 from switch 142 indicating that switch 142 is no longer overwhelmed and may receive additional data transmissions. At this point, the port may be automatically re-designated as unstuck and must start honoring any subsequent pause messages it may receive. Therefore, the port must honor pause message 6 and pause data transmission 5 regardless of whether pause message 6 was received within time period 510.

In another aspect of the present disclosure, a switch may determine that a neighboring port is congested based on the number of resume messages the port receives within a period of time. As noted above, a resume message may allow data transmission to recommence. However, a repaired port may permanently pause again if it receives another series of pause messages. Thus, over a period of time, a switch may count the number of resume messages the port receives to determine whether the port is congested.

Figure 8:
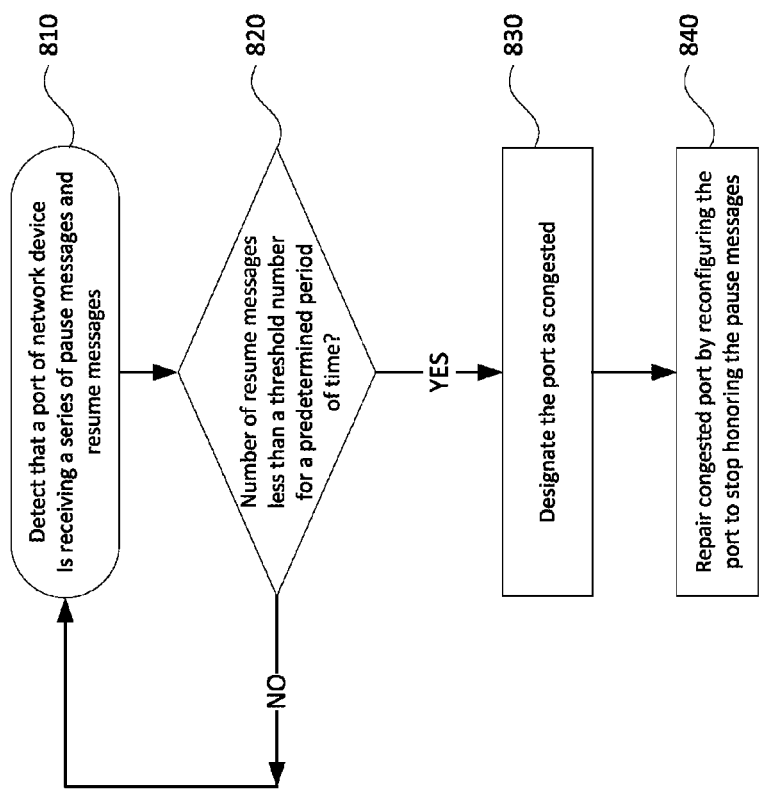
FIG. 8 is a flow diagram of an example method of detecting and repairing a congested port in accordance with aspects of the disclosure.

FIG. 8 is a flow diagram 800 of an example method of congestion detection and repair. For example, at block 810, a switch may detect that a neighboring port is receiving a plurality of pause messages as well as resume messages. In other words, the switch detects that the port is repeatedly stopping and resuming data transmission over a period of time. Similar to the pause detection rule discussed above, the switch may employ a congestion detection rule at block 820 to determine whether the port is congested.

As shown, a congestion detection rule may be based on whether the number of received resume messages is less than a threshold number of resume messages during a predetermined period of time. The switch makes this determination at block 820. If the switch determines that the number of received resume messages is more than the threshold number during the predetermined period of time, then the switch may determine that the port is not congested and may continue to monitor the port for congestion. Similar to the predetermined time period in FIG. 3, various factors may also dictate the threshold number of resume messages, such as network topology, number of total network components, bandwidth, network throughput, number of other connected networks, etc.

If the switch determines that the number of received resume messages is less than the threshold number during the predetermined period of time at block 820, then the switch may designate the port as congested at block 830. A congested port may be treated similar to a stuck port in that the switch may reconfigure the congested port to stop honoring previous and subsequent pause messages. In this regard, the switch repairs the congested port at block 840.

Figure 9:
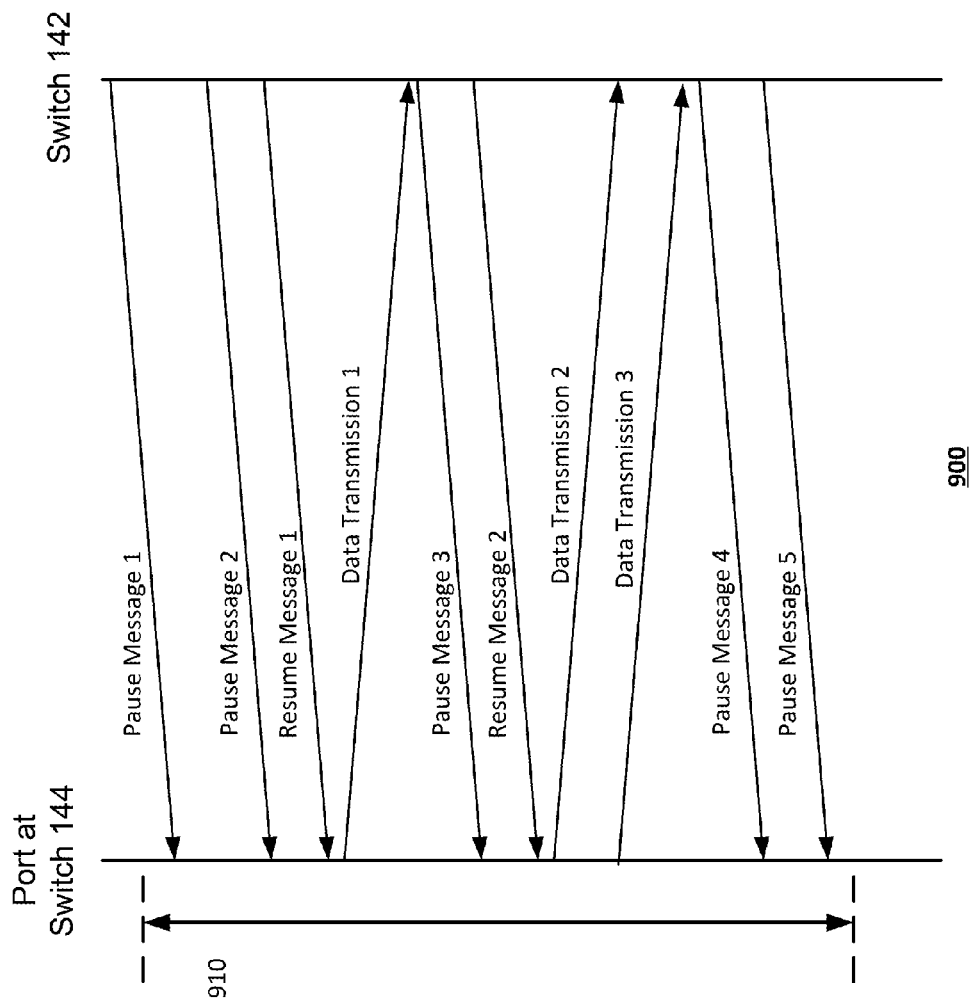
FIG. 9 is another example timing diagram in accordance with aspects of the disclosure.

FIG. 9 is another example flow diagram 900 illustrating the example method of congestion detection and repair depicted in FIG. 8. As shown, a port at switch 144 receives a total five pause messages and two resume messages during the course of a time period 910. As such, switch 140 may detect that the port is repeatedly stopping and resuming data transmission during time period 910. In this example, the threshold number of resume messages may be set to three during time period 910. Therefore, switch 140 may determine that the number of resume messages the port receives within time period 910 is less than the threshold number of resume messages. In that regard, switch 140 may determine that the port is congested and apply one or more congestion repair rules in order to alleviate the congestion at the port.

In one example, the applied congestion repair rule may be similar to the repair rules implemented for stuck rules, as discussed above. In FIG. 9, once switch 140 determines that the port is congested, the port may be reconfigured to stop honoring all pause messages and to recommence all data transmission. Again, a consequence of reconfiguring a port to ignore any pause message may be dropped data (e.g., message frames, packets) on the other end of communication. However, the consequence of dropped data packets at switch 142 upon the reconfiguration of the congested port in the example above may be minimal compared to the consequences of a severely paused network.

The above-described aspects of the disclosure may be advantageous in that that a network device may be able to detect, repair and drain backed up network traffic at a permanently paused or congested port of a neighboring device. In that regard, the technology preemptively prevents the entire network fabric from permanently freezing and rendering the network worthless. Another advantage is that the technology may be implemented on any type of network. For example, the detection and repair of permanent pause and congestion may be extended to virtual ports on a priority flow control fabric.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. The examples and other arrangements may be devised without departing from the spirit and scope of the subject matter defined by the appended claims. Further, the same reference numbers in different drawings can identify the same or similar elements.

The invention claimed is:

1. A method comprising:
   detecting, with one or more computing devices, whether a port of a network device receives one or more pause messages, wherein the pause message instructs the network device to pause data transmission;
   determining, with the one or more computing devices, a first period of time during which the port receives the one or more pause messages;
   identifying, with the one or more computing devices, the port as a permanently paused port based on the determined first period of time; and
   reconfiguring, with the one or more computing devices, the permanently paused port to stop complying with the one or more pause messages received during the first period of time, and to not comply with any pause messages received at the port of the network device during a second period of time after the first period of time.

2. The method of claim 1, wherein the reconfiguring further includes instructing, with the one or more computing devices, the permanently paused port to resume data transmission.

3. The method of claim 2, wherein the permanently paused port is reconfigured, with the one or more computing devices, to resume data transmission when the permanently paused port does not receive any additional pause messages for a predetermined period of time.

4. The method of claim 2, wherein the permanently paused port is reconfigured, with the one or more computing devices, to resume data transmission when the permanently paused port receives a resume message, the resume message instructing the network device to resume data transmission.

5. The method of claim 4, further comprising identifying, with the one or more computing devices, the port as a congested port when the port receives a number of resume messages exceeding a predetermined number within a predetermined period of time.

6. The method of claim 5, further comprising reconfiguring, with the one or more computing devices, the congested port to stop complying with the one or more pause messages.

7. The method of claim 1, wherein the one or more computing devices include at least one of a switch, router and a centralized controller.

8. The method of claim 1, wherein the port of the network device, during the first period of time, is configured to comply with the received pause messages by refraining from transmitting data packets, and wherein reconfiguring the permanently paused port comprises reconfiguring the permanently paused port to transmit data packets during the second period of time despite receiving at least one pause message during the first period of time or during the second period of time.

9. A system comprising:
a memory;
one or more processors coupled to the memory, the one or more processors configured to:
detect whether a port of a network device receives one or more pause messages instructing the network device to pause data transmission;
determine a first period of time during which the port receives the one or more pause messages;
identify the port as a permanently paused port based on the determined first period of time; and
reconfigure the permanently paused port to stop complying with the one or more pause messages received during the first period of time, and to not comply with any pause messages received at the port of the network device during a second period of time after the first period of time.

10. The system of claim 9, wherein the one or more processors are further configured to instruct the permanently paused port to resume data transmission.

11. The system of claim 10, wherein the permanently paused port is reconfigured to resume data transmission when the permanently paused port does not receive any additional pause messages for a predetermined period of time.

12. The system of claim 10, wherein the permanently paused port is reconfigured to resume data transmission when the permanently paused port receives a resume message, the resume message instructing the network device to resume data transmission.

13. The system of claim 12, wherein the one or more processors are further configured to identify the port as a congested port when the port receives a number of resume messages exceeding a predetermined number within a predetermined period of time.

14. The system of claim 13, wherein the one or more processors are further configured to reconfigure the congested port to stop complying with the one or more pause messages.

15. The system of claim 9, wherein the one or more computing devices includes at least one of a switch, router and a centralized controller.

16. The system of claim 9, wherein the port of the network device, during the first period of time, is configured to comply with the received pause messages by refraining from transmitting data packets, and wherein the one or more processors is configured to reconfigure the permanently paused port to transmit data packets during the second period of time despite receiving at least one pause message during the first period of time or during the second period of time.

17. A non-transitory, tangible computer-readable medium on which instructions are stored, the instructions, when executed by one or more computing devices perform a method, the method comprising:
detecting whether a port of a network device receives one or more pause messages, wherein the pause message instructs the network device to pause data transmission;
determining a first period of time during which the port receives the one or more pause messages;
identifying the port as a permanently paused port based on the determined first period of time; and
reconfiguring the permanently paused port to stop complying with the one or more pause messages received during the first period of time, and to not comply with any pause messages received at the port of the network device during a second period of time after the first period of time.

18. The non-transitory, tangible computer-readable medium of claim 17, wherein the reconfiguring further includes instructing the permanently paused port to resume data transmission.

19. The non-transitory, tangible computer-readable medium of claim 18, wherein the permanently paused port is reconfigured to resume data transmission when the permanently paused port does not receive any additional pause messages for a predetermined period of time.

20. The non-transitory, tangible computer-readable medium of claim 18, wherein the permanently paused port is reconfigured to resume data transmission when the permanently paused port receives a resume message, the resume message instructing the network device to resume data transmission.

21. The non-transitory, tangible computer-readable medium of claim 20, further comprising identifying the port as a congested port when the port receives a number of resume messages exceeding a predetermined number within a predetermined period of time.

22. The non-transitory, tangible computer-readable medium of claim 21, further comprising reconfiguring the congested port to stop complying with the one or more pause messages.

23. The computer readable medium of claim 17, wherein the port of the network device, during the first period of time, is configured to comply with the received pause messages by refraining from transmitting data packets, and wherein reconfiguring the permanently paused port comprises reconfiguring the permanently paused port to transmit data packets during the second period of time despite receiving at least one pause message during the first period of time or during the second period of time.

* * * * *